US011037477B2

(12) United States Patent
Choi et al.

(10) Patent No.: US 11,037,477 B2
(45) Date of Patent: Jun. 15, 2021

(54) DISPLAY APPARATUS, AND METHOD AND SYSTEM FOR CONTROLLING THE SAME

(71) Applicant: SAMSUNG ELECTRONICS CO., LTD., Suwon-si (KR)

(72) Inventors: Hyunmook Choi, Suwon-si (KR); Boyoung Kim, Suwon-si (KR); Hwichul Kim, Suwon-si (KR); Euihyung Yoo, Suwon-si (KR); Kwansoo Lee, Suwon-si (KR); Sanghyeok Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/572,043

(22) Filed: Sep. 16, 2019

(65) Prior Publication Data

US 2020/0105177 A1 Apr. 2, 2020

(30) Foreign Application Priority Data

Oct. 1, 2018 (KR) ........................ 10-2018-0116854

(51) Int. Cl.
*G06F 3/038* (2013.01)
*G09G 3/20* (2006.01)

(52) U.S. Cl.
CPC ....... *G09G 3/20* (2013.01); *G09G 2320/0252* (2013.01); *G09G 2320/103* (2013.01); *G09G 2340/0435* (2013.01)

(58) Field of Classification Search
USPC .......... 345/204, 205, 547, 1.1, 215, 210, 99; 348/53
See application file for complete search history.

(56) References Cited

U.S. PATENT DOCUMENTS

2006/0038740 A1* 2/2006 Jung .................... G09G 3/3666 345/1.1
2009/0295786 A1* 12/2009 Ito ........................ G09G 3/3648 345/215

(Continued)

FOREIGN PATENT DOCUMENTS

KR 10-2013-0118967 A 10/2013
KR 10-2017-0076478 A 7/2017

OTHER PUBLICATIONS

International Search Report and Written Opinion (ISA/210&237) dated Jan. 22, 2020, issued by International Searching Authority in counterpart International Application No. PCT/KR2019/012411.

*Primary Examiner* — Thuy N Pardo
(74) *Attorney, Agent, or Firm* — Sughrue Mion, PLLC

(57) ABSTRACT

Provided are a display apparatus, and a method and system for controlling the same, the display apparatus including: a display; an interface; a storage; and a processor configured to transmit information on a refresh rate of the display, stored in the storage, to a source apparatus connected to the interface; based on an image signal received from the source apparatus being displayed as an image on the display at a preset first refresh rate for more than a predetermined period, switch the refresh rate, stored in the storage, to a second refresh rate that is lower than the first refresh rate; transmit information about the second refresh rate to the source apparatus; and display the image on the display at the second refresh rate of the image signal received from the source apparatus.

17 Claims, 6 Drawing Sheets

(56) References Cited

U.S. PATENT DOCUMENTS

| | | | | |
|---|---|---|---|---|
| 2011/0074301 | A1* | 3/2011 | Goder | H05B 45/37 315/210 |
| 2012/0188262 | A1 | 7/2012 | Rabii | |
| 2013/0016195 | A1* | 1/2013 | Wu | H04N 13/341 348/53 |
| 2014/0055476 | A1* | 2/2014 | Wang | G06T 1/60 345/547 |
| 2014/0306872 | A1* | 10/2014 | Yun | G09G 3/3688 345/99 |
| 2015/0243233 | A1* | 8/2015 | Bloks | G09G 3/3614 345/96 |
| 2017/0263201 | A1* | 9/2017 | Sato | G09G 3/3648 345/204 |
| 2018/0033378 | A1* | 2/2018 | Li | G09G 3/34 345/205 |
| 2018/0061311 | A1* | 3/2018 | Lin | G09G 3/3233 345/547 |
| 2018/0174551 | A1* | 6/2018 | Ansari | G09G 5/12 345/204 |
| 2018/0254015 | A1* | 9/2018 | Suyama | G09G 3/3614 345/204 |
| 2020/0258454 | A1* | 8/2020 | Wang | G09G 3/2044 345/204 |

* cited by examiner

DISPLAY APPARATUS, AND METHOD AND SYSTEM FOR CONTROLLING THE SAME

CROSS-REFERENCE TO RELATED APPLICATION(S)

This application is based on and claims priority under 35 U.S.C. § 119 to Korean Patent Application No. 10-2018-0116854, filed on Oct. 1, 2018, in the Korean Intellectual Property Office, the disclosure of which is incorporated by reference herein in its entirety.

BACKGROUND

Field

The disclosure relates to a display apparatus, and a method and system for controlling the same, and more particularly, to a display apparatus displaying an image based on a signal received from a plurality of source apparatuses, and a method and a system for controlling the same.

Description of the Related Art

A display apparatus, such as a monitor, receives an image signal from a source apparatus and displays an image of content.

The display apparatus stores information about an operable refresh rate range of a screen and transmits the stored information to the source apparatus, and cause the source apparatus to provide an image signal, which is within the refresh rate range of the display apparatus, to the display apparatus.

With development of multimedia technology and image processing technology, various pieces of content may be executed and provided through the display apparatus.

In particular, due to development of graphic technology in executing game content, the display apparatus may have an influence on results of a game, beyond simply outputting an image. Therefore, in terms of marketing, it is important to inform a consumer of whether the display apparatus is capable of outputting an image of high quality required in the game content or the like.

However, in comparison with the technological development of a graphic processor and the like hardware, the development of the monitor and the like display apparatus have been comparably slower. Further, the graphic processor and the display apparatus are different in a replacement cycle.

Accordingly, even though the source apparatus has the graphic processor capable of processing game content of high quality, an image may not be displayed based on the content's own quality because of the operable refresh rate of the display apparatus.

SUMMARY

According to an embodiment, there is provided a display apparatus including: a display; an interface; a storage; and a processor configured to transmit information on a refresh rate of the display, stored in the storage, to a source apparatus connected to the interface; based on an image signal received from the source apparatus being displayed as an image on the display at a preset first refresh rate for more than a predetermined period, switch the refresh rate, stored in the storage, to a second refresh rate that is lower than the first refresh rate; transmit information about the second refresh rate to the source apparatus; and display an image on the display at the second refresh rate of the image signal received from the source apparatus.

The display apparatus may further include the processor that is further configured to identify the refresh rate of the displayed image based on timing information of a vertical sync signal included in the received image signal.

The display apparatus may further include the refresh rate of the received image signal that varies within a range corresponding to the first refresh rate.

The display apparatus further including an image processor configured to synchronize the refresh rate of the image displayed on the display with the varying refresh rate of the received image signal.

The display apparatus further including the storage configured to store information about the first refresh rate corresponding to a first mode, and information about the second refresh rate corresponding to a second mode, and the processor further configured to switch the stored refresh rate to at least one of the first mode and the second mode.

The display apparatus further including the processor that is further configured to transmit information about one of the first refresh rate and the second refresh rate to the source apparatus through the interface.

The display apparatus further including a user input receiver configured to receive a selection of at least one of the first mode and the second mode.

The display apparatus including the processor configured to, based on the image being displayed at the second refresh rate for more than a predetermined time, switch the refresh rate stored in the storage to the first refresh rate, and transmit the information about the first refresh rate to the source apparatus through the interface.

According to another embodiment, there is provided a method of controlling a display apparatus, including: transmitting information about a refresh rate of a display, stored in a storage, to a source apparatus connected through an interface; displaying an image on the display based on an image signal received from the source apparatus; based on the image being displayed at a preset first refresh rate for more than a predetermined period, switching the refresh rate, stored in the storage, to a second refresh rate that is lower than the first refresh rate; transmitting information about the second refresh rate to the source apparatus; and displaying an image on the display at the second refresh rate of the image signal received from the source apparatus.

The method may further include identifying the refresh rate of the displayed image based on timing information of a vertical sync signal included in the received image signal.

The method may further include the refresh rate of the received image signal that varies within a range corresponding to the first refresh rate.

The method may further include synchronizing the refresh rate of the image displayed on the display with the varying refresh rate of the received image signal.

The method may further include the storage that is configured to store information about the first refresh rate corresponding to a first mode, and information about the second refresh rate corresponding to a second mode, and the method further comprises switching the stored refresh rate to at least one of the first mode and the second mode.

The method further including transmitting information about one of the first refresh rate and the second refresh rate to the source apparatus through the interface.

The method further including receiving a selection of at least one of the first mode and the second mode.

The method further including: based on the image being displayed at the second refresh rate for more than a predetermined time period, switching the refresh rate, stored in the storage, to the first refresh rate; and transmitting the information about the first refresh rate to the source apparatus through the interface.

According to another embodiment, there is provided a system with a source apparatus and a display apparatus, the source apparatus comprising: a graphic processor configured to output an image signal; and a first interface configured to connect with the display apparatus and transmit the image signal to the display apparatus, the display apparatus comprising: a display; a second interface configured to connect with the source apparatus and receive the image signal; a storage; and a processor, wherein the processor is configured to: based on the received image signal displayed as an image on the display at a preset first refresh rate for more than a predetermined period, switch the refresh rate, stored in the storage, to a second refresh rate that is lower than the first refresh rate; transmit information about the second refresh rate to the source apparatus, and wherein the graphic processor is configured to output an image signal corresponding to the second refresh rate.

The system may further include the processor that is configured to receive the image signal corresponding to the second refresh rate from the source apparatus through the interface; and display an image on the display at the second refresh rate based on the received image signal.

The system may further include the processor that is configured to identify the refresh rate of the displayed image based on timing information of a vertical sync signal included in the received image signal.

The system may further include the refresh rate of the received image signal varies within a range corresponding to the first refresh rate, and the display apparatus further may further include an image processor configured to synchronize the refresh rate of the image displayed on the display with the varying refresh rate of the received image signal.

BRIEF DESCRIPTION OF THE DRAWINGS

The above and/or other aspects, features, and advantages of certain embodiments of the present disclosure will be more apparent and more readily appreciated from the following description taken in conjunction with the accompanying drawings, in which.

DETAILED DESCRIPTION

Figure 1:
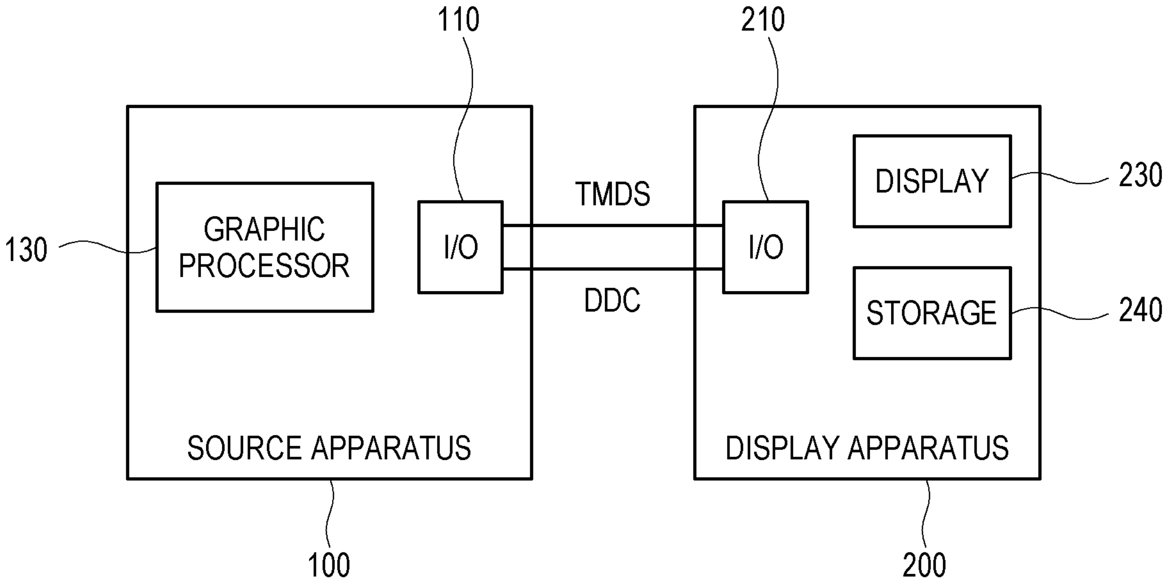
FIG. 1 is a schematic block diagram of a source apparatus and a display apparatus according to an embodiment.

Here, embodiments of the present disclosure will be described in detail with reference to accompanying drawings. In the drawings, like numerals or symbols may refer to like elements having substantially the same function, and the size of each element may be exaggerated for clarity and convenience of description. However, the configurations and functions illustrated in the following embodiments may not be construed as limiting the present inventive concept and the key configurations and functions. In the descriptions herein, details about publicly known functions or features will be omitted if it is identified that they obscure the gist of the present inventive concept.

In the following embodiments, terms "first," "second," and etc. are only used to distinguish one element from another, and singular forms are intended to include plural forms unless otherwise mentioned contextually. In the following embodiments, it may be understood that terms "comprise," "include," "have," and etc. do not preclude the presence or addition of one or more other features, numbers, steps, operation, elements, components or combination thereof. In addition, a "module" or a "portion" may perform at least one function or operation, be achieved by hardware, software or combination of hardware and software, and be integrated into at least one module. In the present disclosure, at least one among a plurality of elements may refer to not only all the plurality of elements, but also each one of the plurality of elements excluding the other elements and a combination thereof.

The present disclosure provides a display apparatus, of which operation is extensible to a range beyond a support refresh rate range, and a method and a system for controlling the same.

Further, the present disclosure provides a display apparatus, which may perform control not to get overloaded with an extensible operation beyond a support refresh rate range, and a method and a system for controlling the same.

FIG. 1 is a schematic block diagram of a source apparatus and a display apparatus according to an embodiment.

As shown in FIG. 1, a display apparatus 200 may process a signal from a source apparatus 100 by a preset image processing and may display an image based on the processed signal. The display apparatus 200 may operate as a sink apparatus that receives an image signal from the source apparatus 100.

According to an embodiment, the display apparatus 200 is actualized by a monitor that receives an image signal from the source apparatus 100, for example, a main body of a desktop computer or the like personal computer (PC). The source apparatus 100 and the display apparatus 200 may connect with each other through a cable according to at least one of predetermined standards, for example, a high definition multimedia interface (HDMI), a digital visual interface (DVI), a display port (DP), or a D-sub, and exchange video/audio/control data.

The source apparatus 100 and the display apparatus 200 may include input/output (I/O) interfaces 110 and 210 for transmitting and receiving the data, and each of the interfaces 110 and 210 may include a controller for controlling data communication using the cable.

The interfaces 110 and 210 may provide a display data channel (DDC) of video electronics standards associations (VESA). The DDC may be used in exchanging configuration and state information between the source apparatus 100 and the sink apparatus, or the display apparatus 200.

Further, the interfaces 110 and 210 may provide a transition minimized differential signaling (TMDS) data channel and a TMDS clock channel. The TMDS data channel may be used in transmitting video data, audio data, and auxiliary data.

A storage 240 of the display apparatus 200 may be configured to store extended display identification data (EDID), and the source apparatus 100 may read the EDID of the display apparatus 200 and obtain configuration information, support-function information, and the like information of the display apparatus 200. In this embodiment, the term 'EDID' may also include E-EDID.

The EDID may include information about a refresh rate of a display 230 for displaying an image, e.g., information about a range of a screen refresh rate or vertical refresh rate (hereinafter, referred to as a "vertical frequency") of displaying an image.

The information obtained by the source apparatus 100 may be transmitted to a graphic processor 130, so that the source apparatus 100 may output an image signal corresponding to the configuration of the display apparatus 200, e.g., the refresh rate of the display 230 by the graphic processor 130, e.g., a graphic card.

The display apparatus 200 may receive an image signal from the source apparatus 100 through the interfaces 110 and 210, and may output to the image signal to the display 230, thereby displaying an image corresponding to its own configuration.

However, the display apparatus 200 actualized according to the present disclosure is not limited to the monitor, and the display apparatus 200 may be actualized by a television (TV) for processing a broadcast image based on at least one of a broadcast signal, broadcast information and broadcast data received from a transmitter of a broadcasting station.

When the display apparatus 200 is the TV, the display apparatus 200 may, for example, wirelessly receive a radio frequency (RF) signal transmitted from the broadcasting station, e.g., a broadcast signal. To this end, the display apparatus 100 may include an antenna to obtain the broadcast signal, and a tuner to be tuned to each individual channel for the broadcast signal. The broadcast signal may be received in the display apparatus 200 through a ground wave, a cable, a satellite, etc. and a signal source in the present disclosure is not limited to the broadcasting station. In other words, a set-top box, a player for an optical disc, such as a Blu-ray or a digital versatile disc, etc., and the like apparatus or station capable of transceiving or relaying data may be included in the signal source of the disclosure, e.g., the source apparatus 100. Further, the image signal may be based on data received through the Internet and the like network.

Standards of a signal received in the display apparatus 100 may be configured by various methods corresponding to actualization types, and for example, a signal may be received by wires based on a high definition multimedia interface (HDMI), DVI, DP, D-sub, composite video, component video, super video, syndicat des constructeurs d'appareils radiorécepteurs et téléviseurs (SCART), and the like standards. Further, the display apparatus 200 may wirelessly receive an image signal through Wi-Fi, Wi-Fi direct, Bluetooth or the like wireless communication.

Further, an image signal may be based on data stored in a nonvolatile storage 240, such as a flash memory, a hard disk, etc. The storage 240 may be provided inside or outside the display apparatus 200. When the storage 240 is provided outside the display apparatus 200, the display apparatus 200 may further include a connector to which the storage 240 is connected.

The display apparatus 200 may process a signal to display on a screen a moving image, a still image, an application, an on-screen display (OSD), a user interface (UI) for controlling various operations (also referred to as a graphic user interface (GUI)), etc. based on a signal/data stored in an internal/external storage medium.

According to an embodiment, the display apparatus 200 may operate as a smart TV or Internet protocol (IP) TV. The smart TV refers to a TV that is capable of obtaining and displaying a broadcast signal in real time, has a web browsing function so that various pieces of content may be searched and consumed through the Internet while the broadcast signal is displayed in real time, and provides a convenient user environment for the web browsing function. Further, the smart TV includes an open-source software platform and thus provides an interactive service to a user. Accordingly, the smart TV may provide a user with various pieces of content, for example, an application for providing a predetermined service through the open-source software platform. Such an application may refer to an application program for providing various kinds of service, and may, for example, include applications for providing services, such as social network service, finance, news, weather, a map, music, a movie, a game, an electronic book, etc.

Here, the elements of the display apparatus according to an embodiment will be described with reference to the accompanying drawings.

Figure 2:
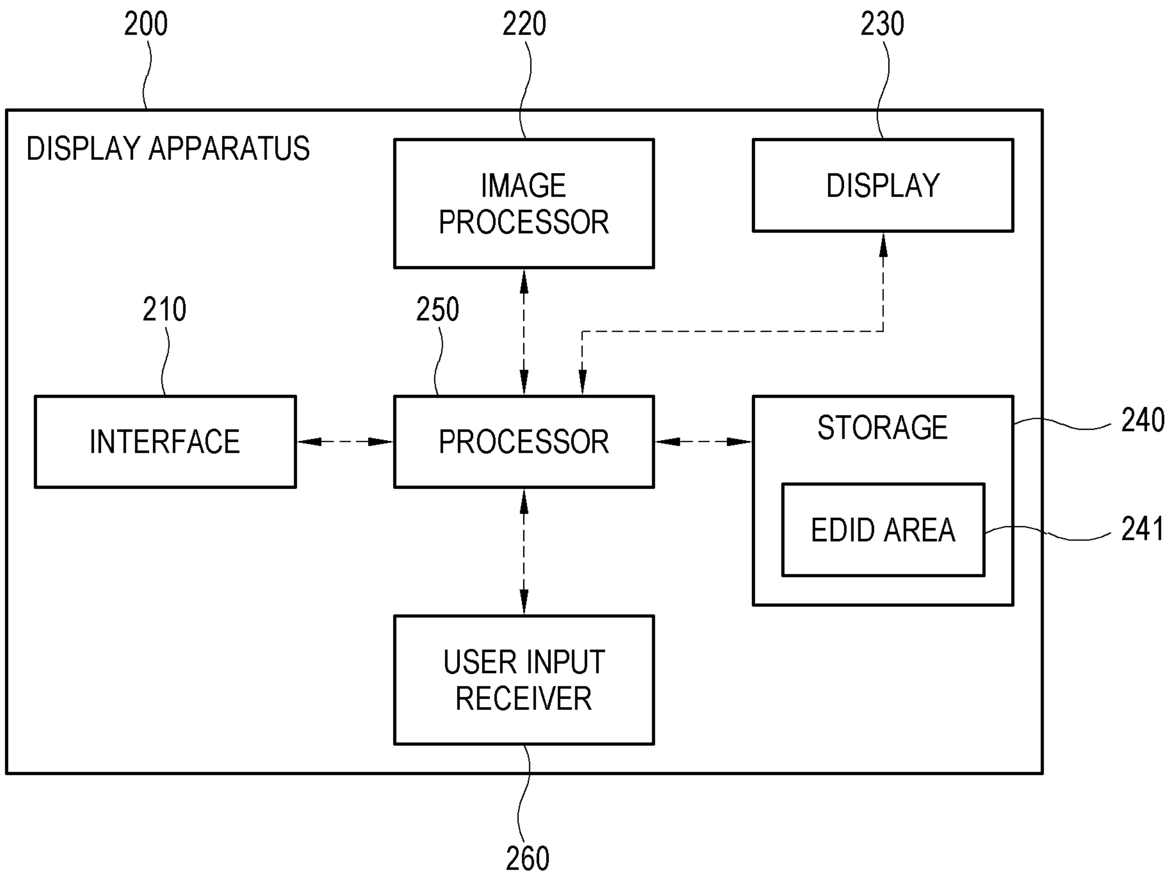
FIG. 2 is a block diagram of the display apparatus according to an embodiment.

FIG. 2 is a block diagram of the display apparatus according to an embodiment.

The display apparatus 200 according to an embodiment may include the interface 210, an image processor 220, the display 230, the storage 240 and an processor 250. The display apparatus 200 may further include a user input receiver 260. However, the display apparatus 200 may include more elements than those shown in FIG. 2 or may include fewer elements than those shown in FIG. 2.

The interface 210 may support communication between the display apparatus 200 and the source apparatus 100. The interface 210 may include a data input/output interface actualized by a communication circuitry in which ports and communication modules (a S/W module, a chip, etc.) corresponding to various communication protocols, such as HDMI, DVI, DP, D-sub, etc., are combined.

The interface 210 may transmit the configuration information of the display apparatus 200, e.g., information about the refresh rate of the display 230, which may be stored in a certain area (e.g., EDID area to be described herein) of the storage 240, to the source apparatus 100.

The refresh rate information transmitted to the source apparatus 100 may be delivered to the graphic processor 130, so that the graphic processor 130 may output an image signal corresponding to the received information about the refresh rate.

The interface 210 may receive the image signal from the source apparatus 100 and deliver the image signal to the image processor 220.

The graphic processor 130 of the source apparatus 100 may output a video stream, of which a frame rate showing the number of screens, or frames, displayed per second to the display apparatus 200. In other words, the screen refresh rate may vary in real time like a high-performance game image. Here, the graphic processor 130 may read the received information about the refresh rate, and output an image signal, the refresh rate of which may vary within the corresponding range.

In case of the game image, the image signal output from the graphic processor 130 may not continuously keep the high refresh rate. Further, the types of games may, for example, include a role playing game (RPG), a real time strategy (RTS), a first-person shooter (FPS), etc. without limitations.

The foregoing refresh rate information, e.g., vertical frequency information, output in real time is identifiable based on timing information of a vertical sync signal Vsync of screen data output from the graphic processor 130.

According to an embodiment, the graphic processor 130 may output an image signal varying in the refresh rate, and the variation in refresh rate of the image signal is visually identified by variation in the cycle of the vertical sync signal Vsync of the screen data in the display apparatus 200 receiving the image signal.

The image processor 220 may output an output signal, which is generated or combined by performing an image process with regard to the image signal received from the source apparatus 100 through the interface 210, to the display 230, thereby making the display 230 display an image based on the image signal.

The image processor 220 may include a scaler that adjusts an image signal to match an output format, for example, panel specifications of the display 230.

According to an embodiment, the image processor 220 may synchronize the image signal received from the source apparatus 100 with the refresh rate of the display 230. In other words, the refresh rate of the displayed image may be synchronized with the output of the graphic processor 230. Here, the image signal may include a video stream, the refresh rate of which varies in real time, like a game image.

That is, the number of screens or frames output from the display 230 per second may vary depending on the refresh rate of the image signal output from the graphic processor 130 of the source apparatus 100. The image processor 220 may bypass and output such an image signal, of which the refresh rate varies, to the display 230, so that the refresh rate of the display 230 may be synchronized with the output of the graphic processor 130.

The image processor 220 may be actualized by a scaler chip as individual elements for independently performing scaling, or may be actualized as included in a main system-on-chip (SoC) where many functions are integrated.

According to an embodiment, the image processor 220 may be included in a printed circuit board (PCB) on which circuitry components, such as wiring, electronic parts, a memory, and various chipsets corresponding to the elements for performing the process of the display apparatus 200, for example, the interface 210, the image processor 220, the storage 240, the processor 250, etc. may be included.

The image signal processed by the image processor 220 may be output to the display 230. The display 230 may display an image based on the image signal obtained from the image processor 220.

The display 230 may, for example, be variously actualized by liquid crystal, plasma, a light emitting diode, an organic light emitting diode, a surface-conduction electron-emitter, a carbon nano-tube, nano-crystal, or the like display type without limitations. According to an embodiment, the display 230 may include a display panel configured to display an image, and may further include an additional element, such as driver.

The storage 240 may be configured to store various pieces of data of the display apparatus 200. The storage 240 may be actualized by a nonvolatile memory or a writable memory, which may retain data even when the display apparatus 200 is powered off, and mirror changes. The storage 240 may include least one among an HDD, a flash memory, an electrically programmable ROM (EPROM) or an electrically erasable and programmable ROM (EEPROM).

The storage 240 may further include a volatile memory such as a random access memory (RAM), and the volatile memory may be provided as a dynamic RAM (DRAM) or static RAM (SRAM), of which reading or writing speed for the display apparatus 200 may be faster than that of the nonvolatile memory.

The term "storage" in this disclosure may be defined to involve not only a nonvolatile memory, but also a volatile memory, a cache memory provided inside the processor 250, and a memory card (e.g., a micro secure digital (SD) card, a memory stick, etc.) mountable to the display apparatus 200 through the connectors that conform to predetermined standards.

Data stored in the storage 240 may, for example, include not only an operating system (OS) for driving the display apparatus 200, but also various applications, image data, auxiliary data, and etc., executable on the OS.

Specifically, the storage 240 may be configured to store a signal or data input/output corresponding to operation of each element under control of the processor 250. The storage 240 may be configured to store a program for controlling the display apparatus 200, a UI related to an application downloaded from the outside or provided by a manufacturer, images for providing the UI, user information, documents, databases, or related data.

According to an embodiment, the storage 240 may include an EDID area 241 in which the EDID is stored. The EDID area 241 may be actualized by an independent memory, for example, an EEPROM. In the EEPROM, the EDID may be writing at a manufacturing process.

In the EDID area 241, the EDID including information about refresh rates respectively corresponding to a plurality of modes may be individually stored. The display apparatus 200 may change the stored EDID in response to selection or switching of the mode.

Here, the change of the EDID may include changing, for example, switching the refresh rate applied to the display 230 over to a selected refresh rate.

According to an embodiment, the change of the EDID may further include changing the information stored in the EDID area 241.

In other words, the change of the EDID may include changing the refresh rate currently applied to the display 230 along with change of the stored information, or changing the refresh rate currently applied to the display 230 without changing the stored information.

The EDID may be changed based on the foregoing changing, for example, switching operation transmitted to the source apparatus 100 through the interface 210, so that the source apparatus 100 may output an image signal corresponding to the changed EDID.

The pieces of EDID corresponding to the modes may include pieces of different information in the refresh rate from one another. Specifically, the EDID corresponding to the first mode and the EDID corresponding to the second mode may respectively include first refresh rate information and second refresh rate information corresponding to different frequency ranges. In other words, the display apparatus 200 may enter a desired mode by the foregoing switching and operate in one of the modes.

For example, the EDID corresponding to the first mode may include the first refresh rate information of 144 Hz, and the EDID corresponding to the second mode may include the second refresh rate information of 120 Hz.

Alternatively, the EDID corresponding to the first mode may include the first refresh rate information of 120 Hz, and the EDID corresponding to the second mode may include the second refresh rate information of 60 Hz.

In the foregoing display apparatus 200 according to an embodiment, the second refresh rate corresponding to the second mode may be lower than the first refresh rate corresponding to the first mode. In other words, the first mode has a refresh rate of which a refresh rate operation range is more extended than that of the second mode.

According to an embodiment, the second refresh rate corresponding to the second mode may match the panel specifications of the display 230. In other words, the first refresh rate in the first mode may be set with a higher range of the refresh rate than the range supported by the display 230, and the display apparatus 200 in the first mode may operate in a dynamic overclocking mode.

Meanwhile, according to another embodiment, the storage 240 may be configured to store EDID corresponding to a plurality of modes, and the stored EDID of the modes may be transmitted to the source apparatus 100 one at a time. In this case, the source apparatus 100 may predetermine refresh rates of an image signal according to modes, and perform control to output an image signal having a refresh rate corresponding to a signal when receiving the signal corresponding to the mode from the display apparatus 200.

The display apparatus 200 may have the first mode and the second mode as the plurality of modes. However, the number and kinds of modes are not limited to the modes described herein. For example, the display apparatus 200 may operate in a third mode, in which a refresh rate is more extended than that of the first mode.

The processor 250 may perform control to operate general elements of the display apparatus 200. The processor 250 may include at least one universal processor that may load at least a part of a control program from a nonvolatile memory, in which the control program is installed in a volatile memory, execute the loaded control program, and be actualized by a CPU, an application processor (AP), or a microprocessor.

The processor 250 may include a single core, a dual core, a triple core, a quad core, and the like multiple core. The processor may include a plurality of processors, for example, a main processor and a sub processor that operates in a sleep mode (during which only standby power is supplied without operation of the display apparatus). Further, the processor, the ROM, and the RAM may be connected to one another through an internal bus.

In the present disclosure, the processor 250 may be actualized, as included in the main SoC mounted to the PCB internally provided in the display apparatus 200. Alternatively, the main SoC may further include the image processor 220 for processing an image signal.

The control program may include a program(s) achieved by at least one of a basic input/output system (BIOS), a device driver, an OS, a firmware, a platform, or an application. According to an embodiment, the application may be pre-installed or stored in the display apparatus 200 when the display apparatus 200 is manufactured, or may be installed in the display apparatus 200 on the basis of application data received from the outside. The application data may, for example, be downloaded from an external server, such as an application market to the display apparatus 200. The external server herein is merely an example of the computer program product, but not limited thereto.

According to an embodiment, the processor 250 may display an image on the display 230 based on an image signal received from the source apparatus 100, identify the refresh rate of the displayed image, and switch the information of the refresh rate stored in the storage 240 over to information of the second refresh rate, which may be lower than the first refresh rate when it is identified that the image is being displayed at a preset first refresh rate for more than a predetermined period of time.

The switched information of the second refresh rate in the second mode may be transmitted to the source apparatus 100 through the interface 210. The graphic processor 130 of the source apparatus 100 may identify the received information, and output an image signal corresponding to the second refresh rate.

Thus, control is possible without overload while doing an extensive operation beyond the refresh rate range supported by the display apparatus 200. Further, stability in operation of the display apparatus 200 may be secured, and an image may be displayed with its own quality.

According to an embodiment, the operation of the processor 250 may be actualized by a computer program stored in the computer program product provided separately from the display apparatus 200.

As such, the computer program product may include a memory in which an instruction corresponding to a computer program is stored, and a processor. The instruction may be executed by the processor and switch the refresh rate when an image displayed on the display 230 is displayed at the preset first refresh rate for more than a predetermined period of time. Accordingly, the display apparatus 200 downloads and executes the computer program stored in a separate computer program product and performs the operation of the processor 250.

Further, the operation of the processor 250 may be actualized by a program stored in a recording medium and readable by a computer. The program, for example, data stored in the recording medium, may be executed as directly accessed by the processor 250, or may be executed as downloaded to the display apparatus 200 through a transfer medium actualized by a wired/wireless network where computer systems are linked.

The user input receiver 260 may transmit various preset control command or unrestricted information to the processor 250 in response to a user's input.

According to an embodiment, the user input receiver 260 may be configured to receive an input of selecting a mode from a user. In other words, a user may input a command, which may select one of the plurality of modes different in the refresh rate from the others, through the user input receiver 260. Sometimes, it may be convenient for a user to make selections.

The user input receiver 260 may include one or more buttons physically provided in the display apparatus 200.

According to an embodiment, the user input receiver 260 may further include an OSD menu displayed on the display 230. For example, when a user presses a certain button of the user input receiver 260, a menu item for selecting one of the plurality of modes, for example, between the first mode and the second mode may be displayed on the display 230.

A user may select a desired mode through the user input receiver 260. For example, a user may select the first mode, which is set to have the first refresh rate higher than the support range of the display 230, when the user wants a high-performance game image to be displayed.

The processor 250 may change information, for example, switching the refresh rate of the EDID area 241 to correspond to the selected mode, so that the display apparatus 200 may operate in the selected mode. Further, the refresh rate information changed by the switching may be transmitted to the source apparatus 100 through the interface 210.

Herein, an operation in which the display apparatus 200 receives an image signal from the source apparatus 100 will be described with reference to the accompanying drawings.

Figure 3:
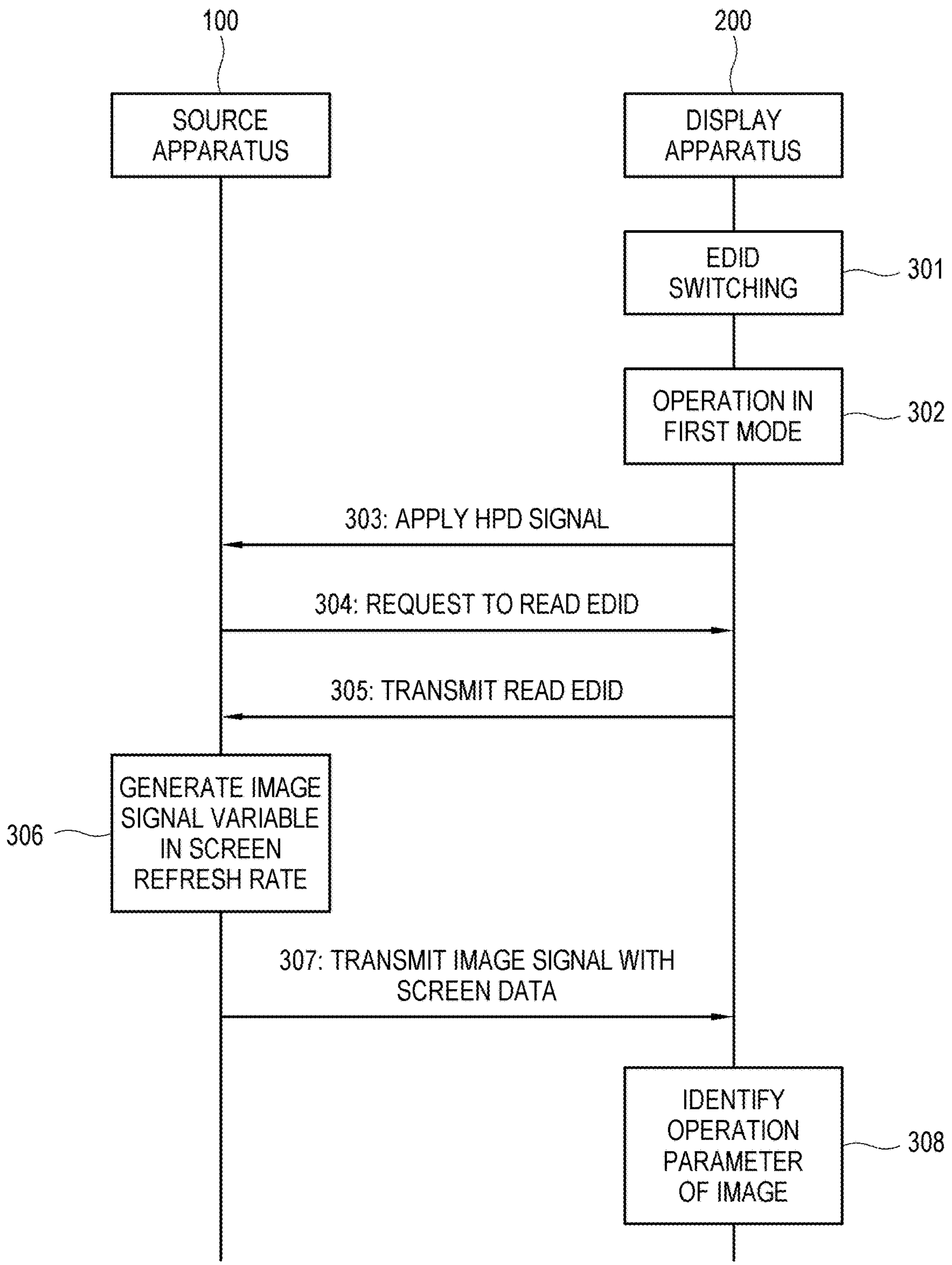
FIG. 3 illustrates data exchange between the source apparatus and the display apparatus according to an embodiment.
Figure 4:
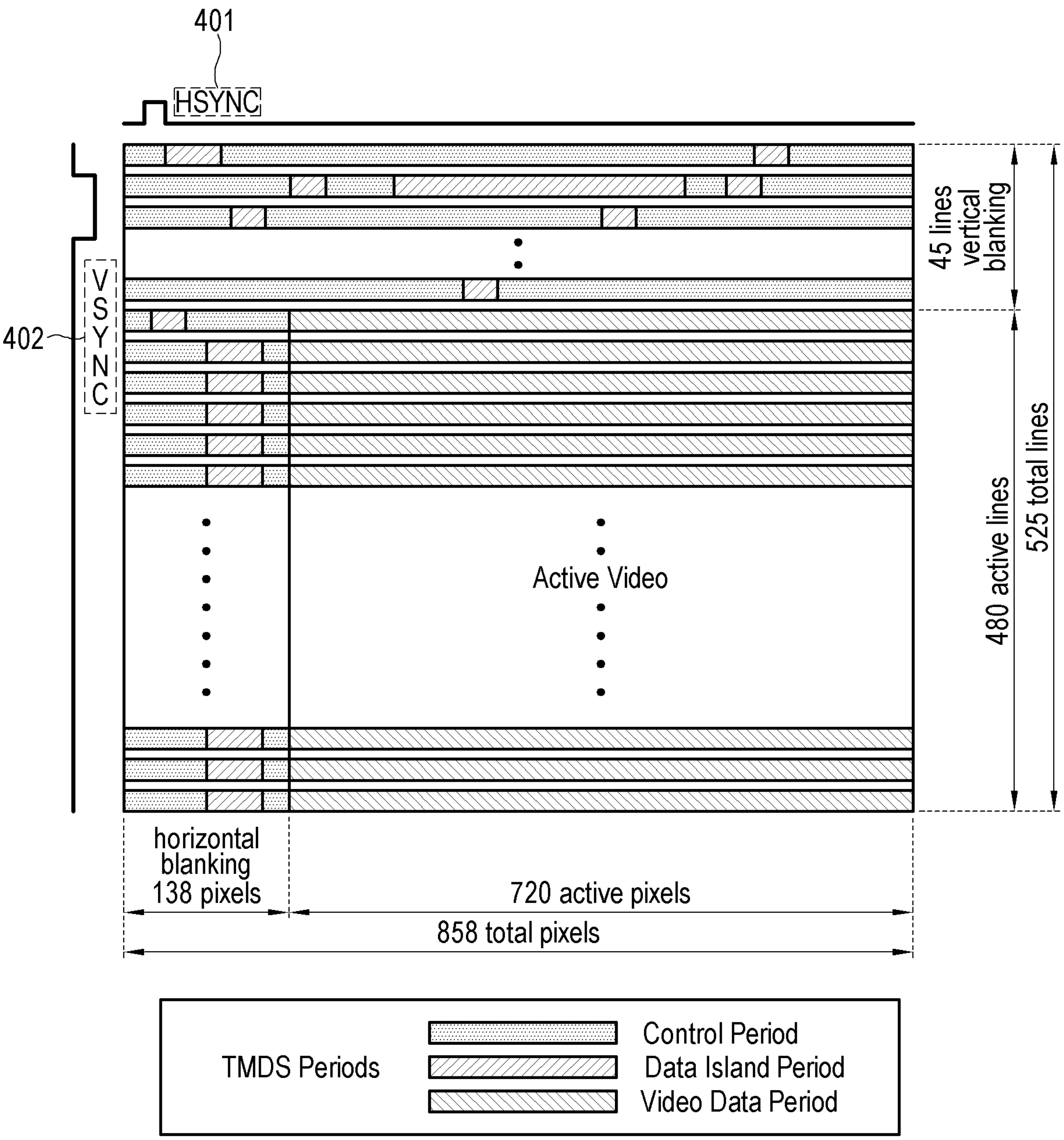
FIG. 4 illustrates an example of screen data involved in an image signal transmitted from the source apparatus to the display apparatus in FIG. 3.

FIG. 3 illustrates data exchange between the source apparatus and the display apparatus according to an embodiment. FIG. 4 illustrates an example of screen data involved in an image signal transmitted from the source apparatus to the display apparatus in FIG. 3.

As shown in FIG. 3, the display apparatus 200 may operate in the first mode of which the refresh rate is extended or changed (S301). Here, the processor 250 may operate in the first mode in response to a user's input for making the display apparatus 200 enter the first mode.

For example, when a user wants to execute a game of high performance, the user may make selection through the user input receiver 260 so that the display apparatus 200 may enter the first mode.

Alternatively, a user may select the first mode in the source apparatus 100. For example, the source apparatus 100 may output a signal to show refresh rate modes as a UI including items selectable by a user, and the user may select the first mode with a separate input device (e.g., a mouse, a keyboard, etc.) connected to the source apparatus 100 through the UI displayed on the display 230. The information about the selected mode may be given to the display apparatus 200 through the interfaces 110 and 210.

In response to the mode selection or change for the display apparatus 200, the EDID stored in the EDID area 241 of the storage 240 may also be changed, for example, switching to correspond to the first mode (S302).

Further, a hot-plug-detect (HPD) signal may be transmitted from the display apparatus 200 to the source apparatus 100 (S303). Typically, the HPD signal is transmitted when the source apparatus 100 and the display apparatus 200 are connected by supplied power. However, the HPD signal may be transmitted in response to the mode selection or change for the display apparatus 200.

The source apparatus 100 may receive the HPD signal from the display apparatus 200, recognize that an access to the EDID is allowed, and make a request for the display apparatus 200 to read the EDID (S304).

In response to the request to read the EDID, the display apparatus 200 may transmit, the switched or changed EDID from the EDID area 241 of the storage 240, to the source apparatus 100 through the DDC of the interfaces 110 and 210 (S305).

By reading the EDED received in the source apparatus 100, an image signal, of which the refresh rate varies within the range based on the first refresh rate of the first mode, may be generated (S306). In other words, the graphic processor 130 may generate an image signal, of which the refresh rate is not constant but continuously varied like an image of a high-performance game.

For example, when the EDID corresponding to the first mode has the first refresh rate of 144 Hz, the image signal may include a video stream of which the refresh rate varies in real time within a range of 30-144 Hz.

Here, the information about the refresh rate varying in real time may be identified based on the vertical sync signal Vsync of the screen data output from the graphic processor 130.

As shown in FIG. 4, the screen data may include color information of a screen, and a horizontal sync signal Hsync 401, a vertical sync signal Vsync 402 and the like operation parameters for an image signal. Here, the horizontal sync signal Hsync 401 and the vertical sync signal Vsync 402 may be used to distinguish between a screen resolution and a frame, and the refresh rate information of the screen may be identified based on timing information of the vertical sync signal Vsync 402. Thus, the display apparatus 200, which displays an image of which the refresh rate varies, like a game image, may easily check the refresh rate varying in real time.

According to an embodiment, the processor 250 may control the display 230 to display the identified refresh rate information of the screen. A user may check the refresh rate information varied in real time, thereby receiving feedback on quality of a displayed image.

Referring back to FIG. 3, the source apparatus 100 may transmit an image signal including the foregoing screen data to the display apparatus 200 (S307).

The processor 250 of the display apparatus 200 may identify the operation parameter of the screen data included in the image signal (S308). Accordingly, the processor 250 may check the variable refresh rate of the image displayed on the display 230.

Herein, a method of controlling a display apparatus according to an embodiment will be described with reference to the accompanying drawings.

Figure 5:
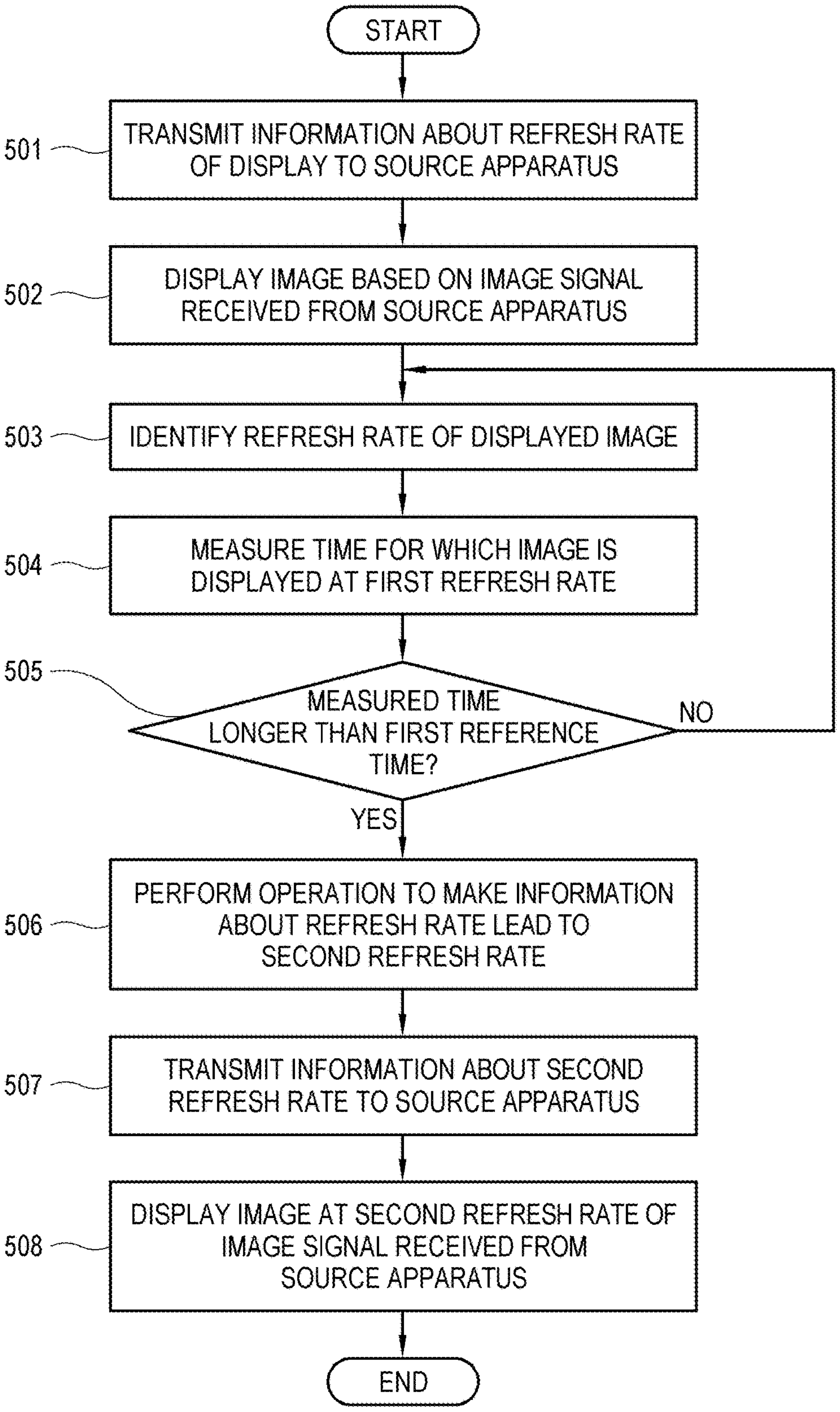
FIG. 5 is a flowchart showing a method of controlling a display apparatus according to an embodiment.

FIG. 5 is a flowchart showing a method of controlling a display apparatus according to an embodiment.

As shown in FIG. 5, the display apparatus 200 may transmit information about the refresh rate of the display 230 to the display apparatus 200 (S501). Here, the information about the refresh rate may be included in the EDID stored in the EDID area 241 of the storage 240. The EDID area 241 may be configured to individually store the EDID respectively corresponding to the plurality of modes, and the EDID corresponding to the operation mode of the display apparatus 200 may be transmitted to the source apparatus 100.

For example, when a user's input is received through the user input receiver 260 to operate in the first mode having the refresh rate of which the operable refresh rate range is extended, the information about the first screen refresh rate corresponding to the first mode may be transmitted to the source apparatus 100.

In the operation S501, the information about the refresh rate is transmitted through the DDC of the interface 210.

The display apparatus 200 may receive an image signal from the source apparatus 100 and display an image on the display 230 (S502). Here, the received image signal may include a video stream of which the refresh rate varies. For example, in a case of the first refresh rate of 144 Hz, the refresh rate of the image signal may be continuously varied within a range of 30-144 Hz. Further, in the operation S502, the received image signal may include screen data having the vertical sync signal Vsync by which the refresh rate is identified.

The processor 250 of the display apparatus 200 identifies the refresh rate of the image displayed on the display 230 (S503). The processor 250 may identify the variable refresh rate based on the timing information of the vertical sync signal Vsync of the screen data included in the image signal received in the operation S502.

Based on the identification in the operation S503, the processor 250 measures or counts time for which an image is displayed on the display 230 at the preset first refresh rate (S504). Here, the first refresh rate is set corresponding to the first mode.

Because the first mode according to an embodiment may be set to have the refresh rate more extended than the support range of the display 230, the circuitry, such as a driver IC, is likely to be overloaded with a long time operation for which the image is displayed at the first refresh rate, and thus resulting in abnormal data input or the like malfunction may occur, thereby causing problems such as a shortened life of the display apparatus 200, screen abnormality, and etc. Therefore, a display time may be measured to perform control, so that time, for which the image is displayed at the first refresh rate more extended than the support range, cannot be prolonged more than a threshold value.

Based on measuring the display time in the operation S504, it may be identified whether the time for which the image is displayed at the first refresh rate is longer than or equal to a predetermined period of time, e.g., a first reference time (505). Here, the first reference time may be set as a critical time during which the display apparatus 200 can bear overload caused while displaying the image at the first refresh rate, for example, 3 seconds.

When it is identified in the operation S505 that the image is displayed at the first refresh rate for more than the first reference time, the processor 250 may change the information, for example, switch the refresh rate stored in the EDID area 241 of the storage 240 over to the second refresh rate lower than the first refresh rate (S506). Accordingly, the display apparatus 200 may enter the second mode to operate at the refresh rate within the range supportable by the display 230.

The display apparatus 200 may transmit the EDID of the second mode, which may include information about the refresh rate changed based on switching in the operation S506, for example, information about the second refresh rate, to the source apparatus 100 (S507). The graphic processor 130 of the source apparatus 100 may read the received EDID, and may output an image signal corresponding to the second refresh rate.

Further, the processor 250 may display an image on the display 230 at the second refresh rate of the image signal received from the source apparatus 100 (S508). Accordingly, the display apparatus 200 may be safeguarded from operating for a long time with overload above the support range.

With the foregoing method of controlling the display apparatus according to an embodiment, the image signal of which the refresh rate varies in real time may be displayed as an image at the extended refresh rate beyond the support range of the display apparatus 200, as long as the display time does not exceed the first reference time. Therefore, it may be possible to display content with its own high quality, like a high-performance game image.

Meanwhile, when there is a concern about overload of the display apparatus 200 according to the foregoing embodiment, stability may secured by displaying the image at the second refresh rate matching the requirements of the display apparatus 200. However, such operation may go against an overclocking aim to display the image signal, of which the refresh rate is varied, with the content's own high quality.

Figure 6:
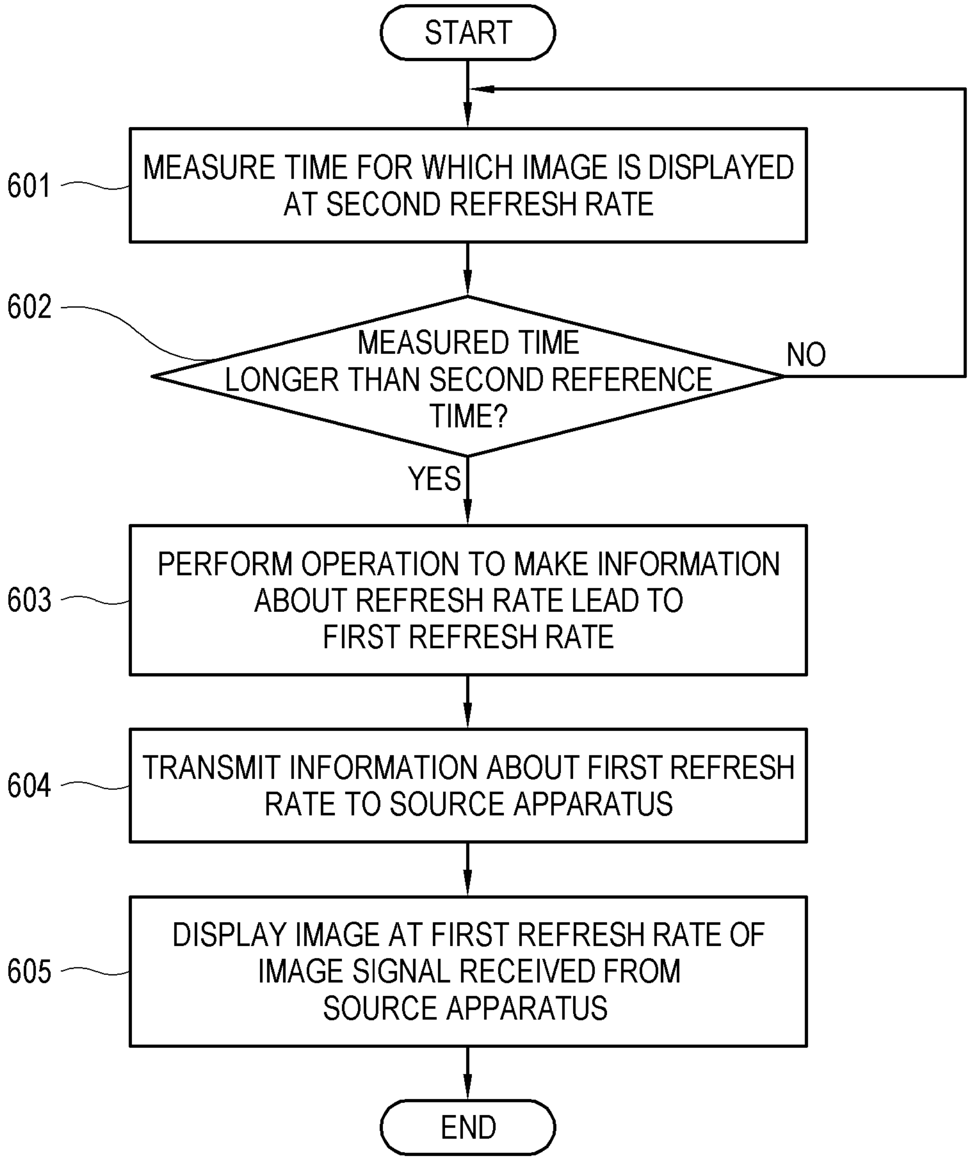
FIG. 6 is a flowchart showing a method of controlling a display apparatus according to another embodiment.

FIG. 6 is a flowchart showing a method of controlling a display apparatus according to another embodiment.

As described in the operation S508 of FIG. 5, the display apparatus 200 may operate in the second mode and display the image on the display 230 at the second refresh rate of the image signal received from the source apparatus 100.

As shown in FIG. 6, the processor 250 may measure time for which the image is displayed at the preset second refresh rate (S601). Here, the processor 250 may identify the refresh rate of the image displayed on the display 230, and then measure time for which the image is displayed at the second refresh rate based on the identified refresh rate. The processor 250 may identify the refresh rate based on the timing information of the vertical sync signal Vsync of the screen data included in the received image signal.

As a counting result in the operation S601, it is identified whether the time for which the image is displayed at the second refresh rate is longer than or equal to a predetermined period of time, for example, a second reference time (S602). Here, the second reference time may be set by considering a time in which an image signal varies in the refresh rate, like a game image signal, and maintains a high refresh rate. The second reference time may be longer than the first reference time.

When it is identified in the operation S602 that the image is displayed at the second refresh rate for more than the second reference time, the processor 250 changes information, or switches the refresh rate stored in the EDID area 241 of the storage 240 over to the first refresh rate higher than the second refresh rate (S603). Accordingly, the display apparatus 200 may enter the first mode to operate at the extended refresh rate beyond the range supportable by the display 230.

The display apparatus 200 may transmit the EDID of the first mode including the information about the refresh rate changed by switching in the operation S603, for example, the information about the first refresh rate to the source apparatus 100 (S604). The graphic processor 130 of the source apparatus 100 may read the received EDID, and output an image signal corresponding to the first refresh rate.

Further, the processor 250 may control the display 230 to display an image at the first refresh rate of the image signal received from the source apparatus 100 (S605). Accordingly, the display apparatus 200 may display an image at the extended refresh rate, thereby displaying content with its own high quality like a high-performance game image.

When the display apparatus 200 displays the image in the first mode like the operation 605, the display apparatus 200 identifies the refresh rate of the displayed image as described in the operation 503 according to the foregoing embodiment shown in FIG. 5, and may selectively operate in the second mode according to the identification results.

Accordingly, the foregoing display apparatus according to the present disclosure, and the method and system controlling the same may prevent overload while operating in an extensible range beyond the refresh rate range supported by the display apparatus.

Further, an image with its original quality may be displayed to a user while securing stability in the operation of the display apparatus, thereby, improving user satisfaction.

Although embodiments herein have been shown and described, it will be appreciated by those skilled in the art that any changes or modifications may be made in embodiments of the present disclosure without departing from the principles and spirit of the invention.

What is claimed is:

1. A display apparatus comprising:
- a display;
- an interface;
- a storage; and
- a processor configured to:
  - transmit information on a refresh rate of the display, stored in the storage, to a source apparatus connected to the interface;
  - based on an image signal received from the source apparatus being displayed as an image on the display at a preset first refresh rate for more than a predetermined period, switch the refresh rate, stored in the storage, to a second refresh rate that is lower than the first refresh rate;
  - transmit information about the second refresh rate to the source apparatus; and
  - display an image on the display at the second refresh rate of the image signal received from the source apparatus, wherein the processor is further configured to identify the refresh rate of the displayed image based on timing information of a vertical sync signal included in the received image signal.

2. The display apparatus according to claim 1, wherein the refresh rate of the received image signal varies within a range corresponding to the first refresh rate.

3. The display apparatus according to claim 2, further comprising an image processor configured to synchronize the refresh rate of the image displayed on the display with the varying refresh rate of the received image signal.

4. The display apparatus according to claim 1, wherein the storage is further configured to store information about the first refresh rate corresponding to a first mode, and information about the second refresh rate corresponding to a second mode, and the processor is further configured to switch the stored refresh rate to at least one of the first mode and the second mode.

5. The display apparatus according to claim 4, wherein the processor is further configured to transmit information about one of the first refresh rate and the second refresh rate to the source apparatus through the interface.

6. The display apparatus according to claim 4, further comprising a user input receiver configured to receive a selection of at least one of the first mode and the second mode.

7. The display apparatus according to claim 1, wherein the processor is configured to, based on the image being displayed at the second refresh rate for more than a predetermined time, switch the refresh rate stored in the storage to the first refresh rate, and transmit the information about the first refresh rate to the source apparatus through the interface.

8. A method of controlling a display apparatus, comprising:

transmitting information about a refresh rate of a display, stored in a storage, to a source apparatus connected through an interface;

displaying an image on the display based on an image signal received from the source apparatus;

based on the image being displayed at a preset first refresh rate for more than a predetermined period, switching the refresh rate, stored in the storage, to a second refresh rate that is lower than the first refresh rate;

transmitting information about the second refresh rate to the source apparatus;

displaying an image on the display at the second refresh rate of the image signal received from the source apparatus; and identifying the refresh rate of the displayed image based on timing information of a vertical sync signal included in the received image signal.

9. The method according to claim 8, wherein the refresh rate of the received image signal varies within a range corresponding to the first refresh rate.

10. The method according to claim 9, further comprising synchronizing the refresh rate of the image displayed on the display with the varying refresh rate of the received image signal.

11. The method according to claim 8, wherein the storage is configured to store information about the first refresh rate corresponding to a first mode, and information about the second refresh rate corresponding to a second mode, and the method further comprises switching the stored refresh rate to at least one of the first mode and the second mode.

12. The method according to claim 11, further comprising transmitting information about one of the first refresh rate and the second refresh rate to the source apparatus through the interface.

13. The method according to claim 11, further comprising receiving a selection of at least one of the first mode and the second mode.

14. The method according to claim 8, further comprising:

based on the image being displayed at the second refresh rate for more than a predetermined time period, switching the refresh rate, stored in the storage, to the first refresh rate; and transmitting the information about the first refresh rate to the source apparatus through the interface.

15. A system with a source apparatus and a display apparatus, the source apparatus comprising:

a graphic processor configured to output an image signal; and a first interface configured to connect with the display apparatus and transmit the image signal to the display apparatus, the display apparatus comprising:

a display;

a second interface configured to connect with the source apparatus and receive the image signal;

a storage; and a processor is configured to:

based on the received image signal displayed as an image on the display at a preset first refresh rate for more than a predetermined period, switch the refresh rate, stored in the storage, to a second refresh rate that is lower than the first refresh rate;

transmit information about the second refresh rate to the source apparatus, and wherein the graphic processor is configured to output an image signal corresponding to the second refresh rate, and wherein the processor is configured to identify the refresh rate of the displayed image based on timing information of a vertical sync signal included in the received image signal.

16. The system according to claim 15, wherein the processor is configured to:

receive the image signal corresponding to the second refresh rate from the source apparatus through the interface; and display an image on the display at the second refresh rate based on the received image signal.

17. The system according to claim 15, wherein the refresh rate of the received image signal varies within a range corresponding to the first refresh rate, and the display apparatus further comprises an image processor configured to synchronize the refresh rate of the image displayed on the display with the varying refresh rate of the received image signal.

* * * * *